United States Patent [19]
Herrmann

[11] Patent Number: 5,855,799
[45] Date of Patent: Jan. 5, 1999

[54] ROTARY DISK FILTER WITH BACKWASH

[75] Inventor: Karl-Heinz Herrmann, Midlothian, Va.

[73] Assignee: Pyrox, Inc., Bethesda, Md.

[21] Appl. No.: 770,232

[22] Filed: Dec. 19, 1996

Related U.S. Application Data

[63] Continuation of Ser. No. 299,765, Sep. 1, 1994, abandoned.

[51] Int. Cl.[6] ............................ B01D 37/00; B01D 33/15
[52] U.S. Cl. ....................... 210/780; 210/791; 210/330; 210/331; 210/406; 210/411
[58] Field of Search ................................... 210/107, 108, 210/327, 330, 331, 333.1, 333.01, 345, 393, 406, 411, 780, 791

[56] References Cited

U.S. PATENT DOCUMENTS

| | | |
|---|---|---|
| 86,158 | 1/1869 | Houston . |
| 1,062,236 | 5/1913 | Hitchcock . |
| 1,181,387 | 5/1916 | Joerin, Jr. et al. . |
| 1,259,139 | 3/1918 | Salisbury ................... 210/331 |
| 1,478,125 | 12/1923 | Kear . |
| 1,512,977 | 10/1924 | Depue ....................... 210/411 |
| 1,945,839 | 2/1934 | Von Maltitz ............... 210/411 |
| 2,066,479 | 1/1937 | MacIsaac ................... 210/411 |
| 2,131,002 | 9/1938 | Strennder .................. 210/411 |
| 2,178,240 | 10/1939 | Pascale . |
| 2,227,302 | 12/1940 | Edstrom . |
| 2,256,279 | 9/1941 | Farmer et al. . |
| 2,314,110 | 3/1943 | Stampfel .................... 210/331 |
| 2,775,348 | 12/1956 | Williams . |
| 3,048,191 | 8/1962 | Crang . |
| 3,074,560 | 1/1963 | Kinney . |
| 3,080,977 | 3/1963 | Jones . |
| 3,239,061 | 3/1966 | Horning et al. . |
| 3,256,995 | 6/1966 | Schmid et al. ............. 210/411 |
| 3,306,451 | 2/1967 | Kudlaty . |
| 3,357,566 | 12/1967 | Schmid et al. . |
| 3,367,506 | 2/1968 | Rosaen . |
| 3,425,557 | 2/1969 | Rosaen . |
| 3,574,509 | 4/1971 | Zentis et al. . |
| 3,635,348 | 1/1972 | Carr . |
| 3,640,395 | 2/1972 | Kinney . |
| 3,669,269 | 6/1972 | Kinney . |
| 3,709,362 | 1/1973 | Lindstol . |
| 3,746,171 | 7/1973 | Thomsen . |
| 3,750,885 | 8/1973 | Fournier . |
| 3,757,956 | 9/1973 | Bradel et al. . |
| 3,784,016 | 1/1974 | Akiyama . |
| 3,853,761 | 12/1974 | McClory . |
| 3,907,688 | 9/1975 | Close . |
| 3,926,815 | 12/1975 | McClory . |
| 3,935,106 | 1/1976 | Lipner . |
| 3,940,222 | 2/1976 | Zink . |
| 4,011,662 | 3/1977 | Davis et al. . |
| 4,059,422 | 11/1977 | Steiner . |
| 4,070,288 | 1/1978 | Gerteis . |
| 4,082,664 | 4/1978 | Lindstol . |
| 4,082,673 | 4/1978 | Cilento . |
| 4,085,051 | 4/1978 | Kaminsky et al. . |
| 4,152,265 | 5/1979 | Meyers . |
| 4,156,651 | 5/1979 | Mehoudar . |
| 4,169,789 | 10/1979 | Lerat . |

(List continued on next page.)

FOREIGN PATENT DOCUMENTS

| | | |
|---|---|---|
| 733157 | 10/1932 | France . |
| 1109656 | 1/1956 | France . |
| 410680 | 3/1925 | Germany . |
| 023867 | of 1913 | United Kingdom . |
| 842669 | 7/1960 | United Kingdom . |
| 1215700 | 12/1970 | United Kingdom . |

*Primary Examiner*—Robert Popovics
*Attorney, Agent, or Firm*—Trop, Pruner, Hu & Miles, P.C.

[57] ABSTRACT

A high capacity filter apparatus for removing solids from fluids includes a opposing filter elements defining an internal volume. Fluid to be filtered passes through the filter elements into the internal volume and through an outlet. The filter element is continuously cleaned by backwashing along the outer surface of the elements.

2 Claims, 7 Drawing Sheets

U.S. PATENT DOCUMENTS

| | | | |
|---|---|---|---|
| 4,330,405 | 5/1982 | Davis et al. | 210/331 |
| 4,411,779 | 10/1983 | McConnell, III . | |
| 4,462,916 | 7/1984 | Ecabert et al. . | |
| 4,504,389 | 3/1985 | Rundzaitis . | |
| 4,529,515 | 7/1985 | Selz . | |
| 4,639,315 | 1/1987 | Fuchs et al. | 210/333.1 |
| 4,654,142 | 3/1987 | Thomsen et al. . | |
| 4,702,269 | 10/1987 | Schuler . | |
| 4,702,847 | 10/1987 | Fux et al. | 210/411 |
| 4,721,020 | 6/1981 | Van Meter . | |
| 4,731,183 | 3/1988 | Schumacher, II . | |
| 4,759,846 | 7/1988 | MacFarlane . | |
| 4,818,402 | 4/1989 | Steiner et al. | 210/411 |
| 4,841,595 | 6/1989 | Wiese . | |
| 4,859,335 | 8/1989 | Whyte | 210/411 |
| 5,030,347 | 7/1991 | Drori | 210/331 |
| 5,128,029 | 7/1992 | Herrmann . | |
| 5,164,079 | 11/1992 | Klein | 210/411 |
| 5,330,645 | 7/1994 | Geldmacher | 210/327 |

ROTARY DISK FILTER WITH BACKWASH

This application is a continuation of Ser. No. 08/299,765 filed Sep. 1, 1994 now abandoned.

BACKGROUND OF THE INVENTION

The present invention relates to a continuous backwashing filter apparatus for separating particulate matter from a fluid medium. The continuous backwashing feature enables continuous filtering of high volumes of a fluid medium containing gaseous matter or particles having a broad particle size distribution, including ultrafine particles having a particle size below, for example, 1 $\mu$m.

Conventional filter arrangements have been known wherein a backwash device is provided proximate an inlet side of a filter element in the filter arrangement. For instance, U.S. Pat. No. 4,085,051, to Kaminsky et al, discloses a self-cleaning filter for separating solid particles from a liquid wherein a device for backwashing the filter element abuts the filter element and is rotated about a central shaft such that the filter element can be backwashed of any accumulated particles. However, the backwashing function requires a pressure differential between an inlet chamber and an outlet chamber of the filter apparatus due to the buildup of particulate matter on the inlet side of the filter element.

The creation of that necessary pressure differential requires the presence of a substantial amount of filtered fluid in the outlet chamber. Stated differently, filtered fluid must be present at an outlet side of the filter to provide a liquid medium passing in a reverse direction through the filter to transport the particulate matter off of the inlet side of the filter and into the backwashing device. However, such filtered fluid is not always present at the outlet side in the device of Kaminsky et al. When filtering fluids having particles of a broad particle size distribution, it is inevitable that the filter element will become clogged before there is a sufficient amount of filtered fluid in the outlet chamber to facilitate the backwashing function.

U.S. Pat. No. 3,635,348, to Carr, discloses an automatic self-cleaning strainer which provides a backwash device in abutted contact with an inlet side of a filter element in the strainer. The filter element is shaped like a truncated cone and the shape of the contacting surface of the backwash device is complimentary to the inlet side of the filter element. The backwash device is retractable along a central axis of the filter element to facilitate sequential radial movement of the backwash device within the filter element. This strainer apparatus cannot provide continuous backwashing due to the sequential action of the backwash device. As a result, the efficiency of the strainer apparatus is degraded.

The strainer of the Carr apparatus also suffers from the problem encountered in the filter apparatus of Kaminsky et al in that the backwashing function is contingent upon whether the outlet chamber is filled with filtered fluid, i.e., whether filtered fluid is present proximate an outlet side of the filter element. Accordingly, the strainer apparatus of Carr cannot filter fluid mediums having a broad particle size distribution including ultrafine particles, since it is inevitable that the filter element will become clogged before the outlet chamber is filled with filtered fluid to facilitate the backwashing function.

U.S. Pat. No. 3,640,395, to Kinney, discloses an automatic self-cleaning strainer having a plurality of filter stages including backwash devices in loose contact with an inlet side of the filter element of each filtering stage. Each of the backwashing devices is in communication with a hollow shaft which is open to the atmosphere. However, before the backwashing function will occur, filtered fluid must be present in the outlet chambers of each filtering stage. Therefore, the strainer apparatus cannot filter a fluid medium which contains large amounts of particulate matter including ultrafine particles, since the filter element in each stage will become clogged before the outlet chambers are filled with filtered fluid to facilitate the backwashing function.

U.S. Pat. No. 3,669,269, to Kinney, discloses a filter apparatus having a rotating cylindrical strainer element and a stationary backwash chamber in contact with an inlet side of the strainer element. However, in the device of Kinney '269, as in the other prior art devices, the outlet chamber within the strainer element must be substantially full of filtered fluid before the backwashing function will occur, which does not necessarily always happen. Thus, this strainer apparatus suffers from the same problems as discussed above.

The inventor's prior U.S. Pat. No. 5,128,029 (Herrmann '029) relates to a continuous backwashing filter apparatus with a filtered fluid retention plate. In this apparatus, a sliding shoe containing a slit contacts a perforated plate placed over a filter medium on the inlet side, and removes particles from the medium by backwashing with a reservoir of filtered liquid retained on a retention plate on the outlet side of the filter media.

Backwashing occurs because the pressure in the sliding shoe is less than in the outlet side of the filter. The retention plate is critical to the function of this apparatus, since it provides the constant supply of filtered fluid necessary for constant backwashing. This arrangement, while functional, has several drawbacks.

One drawback is the size limitation of the filter imposed by the sliding shoe/retention plate arrangement. The sliding shoe must be sealed from the unfiltered fluid on the inlet side. If this seal is broken, unfiltered fluid under high pressure will leak into the sliding shoe, and be removed with the backwash, essentially "short circuiting" the filter. This places severe limits on the maximum size and capacity of the filter. For example, filtration of a liquid having a high level of total suspended solids (TSS) with a filter media having a nominal pore size of 10 $\mu$m or less results in very limited filter capacity. This is because a very high differential pressure is necessary to maintain a high flow rate under these conditions. Under such high pressure, the perforated plate above the filter media is forced against the sliding shoe and the backwash function is disabled.

If the size of the filter is increased to provide greater capacity, the contact area between the sliding shoe and the filter media can flex, resulting again in leakage and short circuiting of the filter. Likewise, installing two or more filters in parallel is generally difficult, since the structure of the backwashing function does not lend itself to parallel connection of multiple units.

A second drawback of the inventor's prior design is that, in some embodiments, the retention plate must be maintained horizontally level for proper backwashing, and hence installation of the backwashing filter apparatus is limited to an upright position.

Thus, despite the improvements in filtration afforded by the Herrmann '029 patent, there remains a need in the art for a filter apparatus which can filter very small particles at high capacity, can be installed in any position, and which can be easily expanded to provide further increases in capacity when necessary, and further eliminates the possiblity of leakage.

Sewage treatment is one area in which filtration of small particles at high capacity would be useful. In conventional biological treatment systems, particulates in the wastewater isolate the available oxygen necessary for microbe growth, resulting in delay or elimination of biological breakdown of waste material. An apparatus suitable for ultrafiltration at the high capacities needed for wastewater treatment would greatly expand the capacity and quality of discharge in existing treatment plants and/or reduce the size and complexity of equipment needed for treating a given quantity of sewage.

DISCLOSURE OF THE INVENTION

It is accordingly an object of the invention to provide a filter method apparatus having high capacity.

It is another object of the invention to provide a filter method and apparatus, as above, capable of filtering a fluid having high total suspended solids and/or small particle size, such as 1 μm and less.

It is yet another object of the invention to provide a filter method and apparatus, as above, which can be easily expanded to increase capacity as needed.

It is still another object of the invention to provide a filter method and apparatus, as above, which, when used in conjunction with biological waste treatment, can expand the capacity of existing sewage treatment facilities.

These objects and others set forth in detail below, are achieved by a high capacity filter apparatus for removing solids from fluids which eliminates the need for a retention plate by providing a balanced backwash of opposing filter element surfaces. In one embodiment, the invention provides for a filter housing having an inlet chamber with an inlet permitting introduction of an unfiltered fluid into the inlet chamber. A hollow shaft is located in the filter housing and is rotatable relative to the filter housing about a longitudinal axis. The interior of the hollow shaft defines an outlet chamber having an outlet permitting discharge of filtered fluid from the outlet chamber. A filter disc is secured to the hollow shaft and is rotatable therewith and has a first filter element secured to a first side and a second filter element secured to a second side. A hollow space between the two filter elements defines an internal volume in fluid communication with the outlet chamber in the hollow shaft. The outer surfaces of the first and second filter elements face the inlet chamber and the inner surfaces of the first and second filter elements face the internal volume.

A stationary backwash housing is secured in the inlet chamber to the filter housing and is in sliding and sealing engagement with the outer surfaces of the first and second filter elements. The backwash housing includes slits adjacent each of the first and second filter elements which expose backwash areas on the filter elements in fluid isolation from the inlet chamber.

A conduit is connected to the slits and has an outlet permitting discharge of backwash fluid from the backwash areas. The apparatus also includes a rotation means for rotating the hollow shaft and filter disc.

In operation, the backwash housing provides continuous backwashing of the filter element by continuously exposing a different portion of the filter element forming backwashing areas as the hollow shaft and filter disc are rotated.

In another embodiment, the filter apparatus has at least one hollow filter tube located in the inlet chamber and secured at a first end to a base plate separating an inlet chamber and an outlet chamber. The interior of the tube forms a conduit in fluid connection with the outlet chamber through an opening in the base plate. The filter tube has a filter element on an outer surface thereof facing the inlet chamber. A backwash housing surrounds the filter tube and has seals for slidably sealing a portion of the filter tube from the inlet chamber. A particle collector located within the backwash housing surrounds the tube perimeter, and includes a slit adjacent the tube perimeter which exposes a backwash area on the filter element in fluid isolation from the inlet chamber. A conduit connects to the slit and has an outlet permitting discharge of backwash fluid from the backwash area. Drive means, such as a worm drive or a pneumatic conveyance, are provided for moving the backwash housing along the filter tube.

BRIEF DESCRIPTION OF THE DRAWINGS

For a full understanding of the invention, the following detailed description should be read in conjunction with the drawings, wherein.

DETAILED DESCRIPTION OF THE PREFERRED EMBODIMENTS

Figure 1:
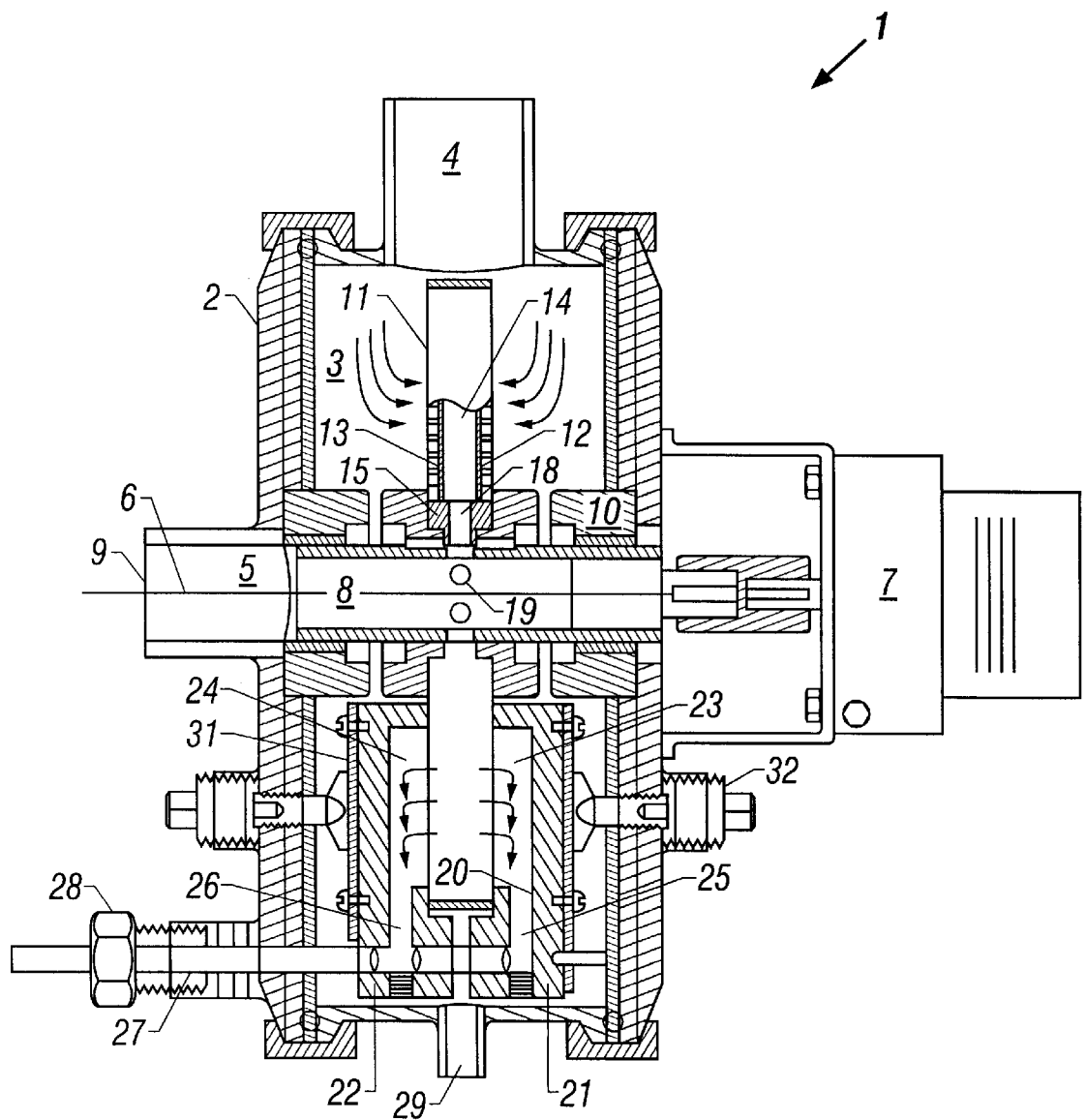
FIG. 1 is a cross-sectional side view of one embodiment of the filter apparatus of the present invention.

A first embodiment of the present invention is illustrated in FIG. 1 and is indicated generally by the number 1. A filter housing 2 has an inlet chamber 3 with an inlet 4 through which unfiltered fluid is introduced into the inlet chamber. A hollow shaft 5 is positioned in the filter housing 2 and is rotatable relative to the filter housing about a longitudinal axis 6. In a preferred embodiment, the shaft 5 is positioned off-center in the filter housing 2, in order to accommodate a backwash housing. Rotation is provided by suitable means such as an electric motor 7 or a pneumatic activator. Other means of rotating will occur to those skilled in the art. The interior of the hollow shaft 5 defines an outlet chamber 8 having an outlet 9. A bearing housing 10 seals the hollow shafts from the inlet chamber 3 as well as serving to allow rotation of the shaft by the motor 7.

Figure 2A:
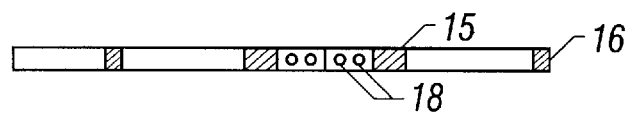
FIGS. 2A and 2B are cross-sectional plan and side views, respectively, of one embodiment of a filter disc of the invention.
Figure 2B:
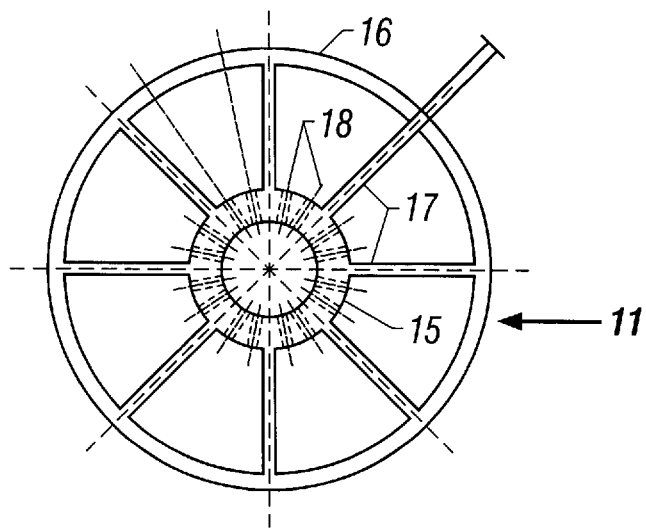
Figure 2C:
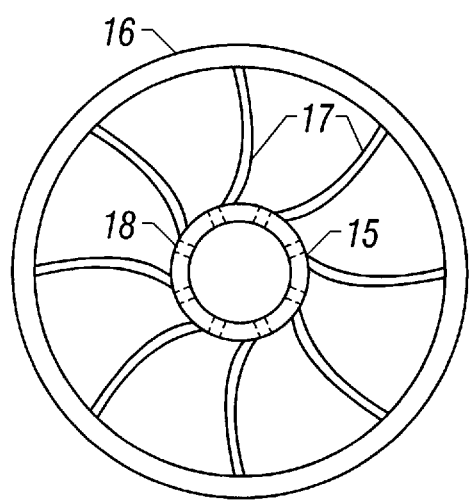
FIG. 2C is a cross-sectional plan and side views, respectively, of a second embodiment of a filter disc of the invention.

A filter disc 11 is secured to the hollow shaft 5 via a keyway or other suitable means and is rotatable with the hollow shaft. The filter disc 11 has a first filter element 12 secured on one side and a second filter element 13 secured on the opposing side. A hollow chamber disposed between the filter element defines an internal volume 14 which is in fluid communication with the outlet chamber 8 in the hollow shaft 5. For this purpose, the disc 11 may have the structure illustrated in FIGS. 2A and 2B, or in FIG. 2C. An inner hub 15 of the disc 11 is concentric with an outer circumferential rim 16 and is connected thereto by a plurality of radial spokes 17. One or more radial apertures 19 are provided in the inner hub 18. FIGS. 2A and 2B illustrate straight radial spokes 17. However, the spokes may be curvilinear as illustrated in FIG. 2C. This structure is advantageous when the filter apparatus is used to filter high viscosity fluids whereby rotation of the disc 11 forces filtered fluid in the internal volume into the hollow shaft in a manner similar to the force of a centrifugal pump.

With reference again to FIG. 1, the apertures 18 in the inner hub 15 of the disc are registered with apertures 19 in the hollow shaft, thus providing fluid flow from the internal volume 14 of the disc 11 into the outlet chamber 8 in the hollow shaft 5. The size and number of the apertures 18 and 19 is determined by the open area in the filter elements 12 and 13 on the disc 5, which in turn is a function of the fluid viscosity, particle loading, flow rate, pressure differential, etc. Sufficient open area is necessary in order to have a sufficient volume of fluid in the internal volume to allow backwashing.

A stationary backwash housing 20 is secured in the inlet chamber 3 to the filter housing 2, and has first and second sides 21 and 22 in sliding and sealing engagement with the first and second filter elements 12 and 13, respectively. First and second slits 23 and 24 are provided in the backwash housing 20 and expose respective backwash areas on the first and second filter elements 12 and 13.

First and second backwash conduits 25 and 26 are connected with the slits and convey backwash from the respective sides of the filter disc to a backwash outlet stream 27. The outlet stream 27 includes a pressure reduction valve to enable regulation of the fluid pressure in the outlet stream. There may optionally be provided an inlet 29 for injecting a fluid, such as air, an inert gas or a liquid, into the inlet chamber 3.

To maintain the seal of the backwash housing to the filter element, there may be employed an adjustable pressure bushing 31 having an adjustment screw 32 or other adjustment means for varying the pressure applied to the back pressure housing. Generally the amount of pressure which is applied will vary depending on the relative pressures in the internal volume and the first and second conduits, as explained in more detail hereinafter.

In a preferred embodiment, the first and second filter elements 12 and 13 are mounted on (e.g., by sintering or otherwise fusing) a perforated plate which forms the contact surface with the backwash housing. The filter element itself can be of any well known design having a wide range of mesh size or actual pore size. The skilled artisan can readily select the appropriate filter element for a particular application.

In operation, an unfiltered fluid is introduced into the inlet chamber 3 through inlet 4 and contacts the outer surfaces of filter elements 12 and 13. The unfiltered fluid is pressurized when entering the inlet 4 to facilitate transport of the fluid through the filter element. When the porosity of the filter element is more than about 1 μm, the steady state inlet pressure is preferably in the range of about 1.5 to about 7.5 bars above atmospheric. The inlet pressure can be controlled by any suitable means, for example, adjustable choke means placed in the inlet 4, but normally, the inlet pressure is sufficiently high (i.e., higher than the pressures in the outlet chamber and backwash housing) and requires no other control.

The filtered fluid exiting from the first and second filter elements enters the internal volume 14 of the filter disc 11 and is transported into the outlet chamber 8 via the apertures 18 and 19 and thereafter passes to the outlet 9 out of the filter apparatus. Each of the chambers in the internal volume defined by the spokes is isolated from the other chambers. This has the advantage that, should one chamber become clogged, the remaining chambers will still function.

The pressure in the outlet chamber is controlled to facilitate the backwashing function. Such control can comprise adjustable choke means and the like provided in the outlet 9. The amount of pressure in the outlet chamber 8 depends upon the size, amount and characteristics of the particulate matter in the unfiltered fluid, but must be higher than the pressure in the backwash housing, as explained below.

Substantially all of the particulate matter present in the unfiltered fluid medium is trapped on the inlet side of the filter elements 12 and 13. The filter disc 11 is rotated via the hollow shaft 5 about a central axis normal to the disc, such that the slits 23 and 24 expose backwash areas on the filter elements 12 and 13. As discussed above, the pressure in outlet chamber 8, and backwash housing 20, and in the inlet chamber 3, if necessary, are controlled such that the pressure in the backwash housing 20 is lower than the pressure in the outlet chamber 8. Ideally, the pressure in the backwash housing (i.e., at the slits) should be as close to atmospheric as possible. Pressures approaching atmospheric are possible due to the superior sealing of the backwash housing afforded in part by the combination of a rigid filter disc and the opposing orientation of the backwash areas. Regarding the latter, the shape stability of the filter disc, and hence the filter element itself, is aided by the application of the opposing pressure differentials on either side of the filter disc via the backwash housing. The filter disc has less tendency to deform because the pressure differential is applied on both sides and in opposite directions. By contrast, in the filter apparatus of U.S. Pat. No. 5,182,029, a pressure differential is maintained on only one side of the filter element, leading to deformation and leakage, especially as the filter element is made larger to accommodate high filtration capacity.

As with the pressures in the inlet and outlet chambers, the pressure in the backwash housing can be controlled by adjustable choke means placed in the backwash outlet 27. A backwash pressure of 1 bar will remove most particles. Adjustment of the pressures, particularly in the backwash housing and the outlet chamber is, of course, dependent upon the nature of the unfiltered fluid and solids to be treated.

Some of the primary control parameters for providing successful filtering in the apparatus of the present invention are the sizing of the apertures 18 and/or 19 as described above, the pressure values in the outlet and backwash chambers, the speed of rotation of the filter disc, and the selection of the filter element.

As a result of the above operation, filtered fluid passes in a reverse direction through the filter elements 12 and 13 at locations corresponding to the backwash areas defined by the slits 23 and 24, to remove particulate matter accumulated on the inlet side of the filter disc 11. Such particulate matter is transported by the filtered fluid which passes back through the filter elements 12 and 13, the slits 23 and 24, the first and second conduits 25 and 26, and finally exits the filter apparatus 1 via the backwash outlet 27.

The filter apparatus of the present invention is capable of high volume filtering and backwashing of ultrafine particulate matter, e.g., on the order of less than 1 $\mu$m. Indeed, with a filer disc having a diameter of 10 inches or less, particulate matter of sizes as small as 0.025 $\mu$m in absolute particle size can be removed from fluids by the apparatus of the present invention at capacities of several hundred gallons per minute (gpm).

The size of the filer disc, and hence the filtration capacity, can vary depending in a particular application. In general, the filter disc can vary in size from four inches to six feet in diameter. For most applications, however, a disc diameter of between eight inches and 14 inches is satisfactory.

A particular application is to filter incoming water to a building such as a house, office building, industrial plant, etc. In this application, the filter of the invention is installed on a water line entering the building. The backwash housing can be rotated by a water-actuated turbine which rotates when flow occurs in the water line. A similar arrangement can be used in a water tap, for example a kitchen sink or shower, to supply filtered water for domestic purposes.

Figure 3:
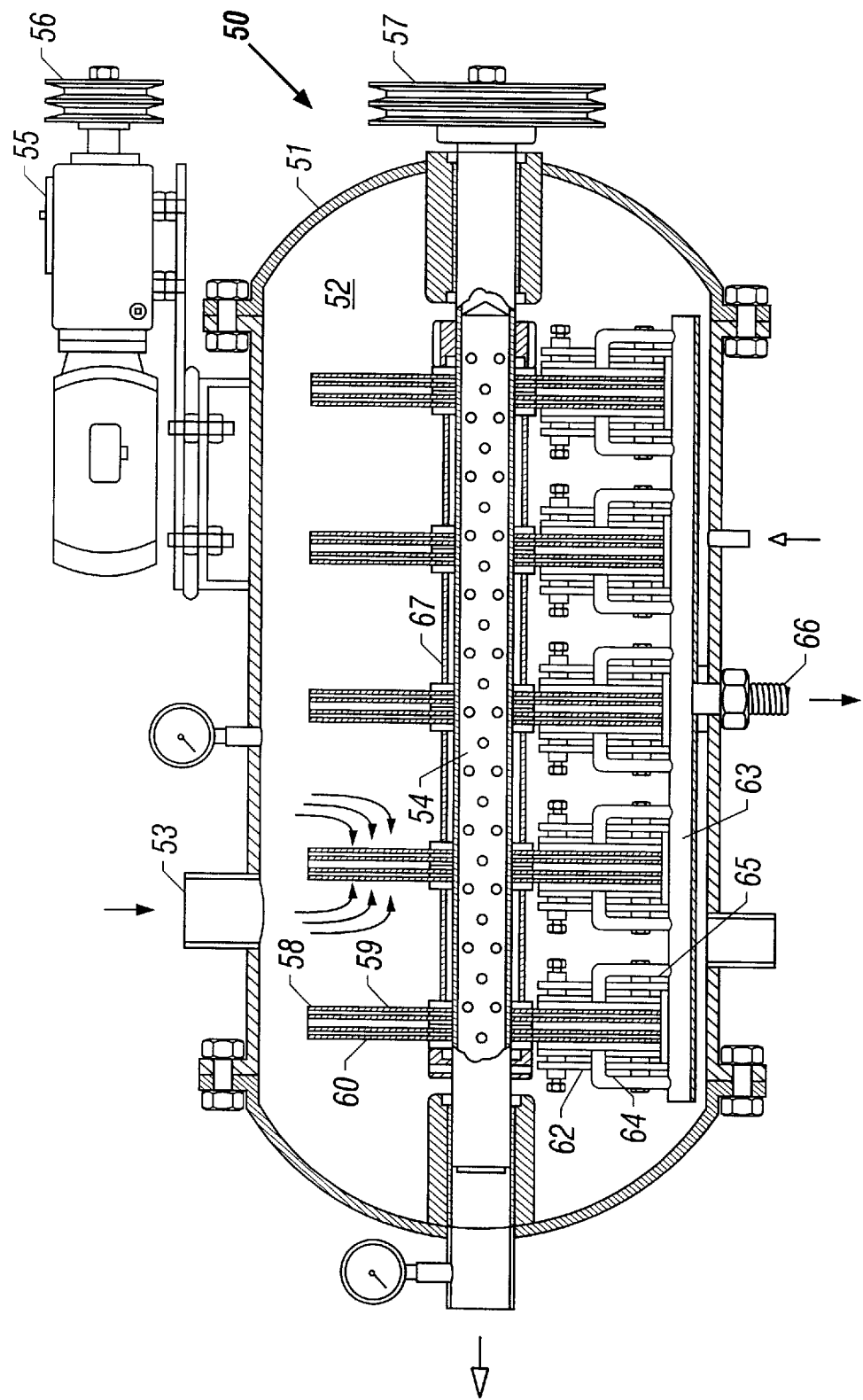
FIG. 3 is a partial cross-sectional side view of a second embodiment of the filter apparatus using multiple filter discs.

The filter apparatus described above is capable of filtering substantially all types of fluid in a single stage. However, to accommodate very high volume and/or very high TSS applications, multiple filter stages similar to the single stage filter described above, can be arranged in parallel. As illustrated in FIG. 3, a multi-element filter apparatus is indicated generally by the number 50. A filter housing 51 has an inlet chamber 52 with an inlet 53. A hollow shaft 54 located in the filter housing 51 is rotatable relative to the housing around a longitudinal axis via, for example, an electric motor 55 and pulleys 56 and 57. Other suitable drive means can also be used.

A plurality of filter discs 58 are secured to the hollow shaft and are rotatable therewith. The construction of the filter discs 58 is similar to that described above. Thus the filter discs have secured thereto first and second filter elements 59 and 60 and have an internal volume 61. Backwash housings 62 are in sliding and sealing engagement with the outer surfaces of the filter elements 59 and 60.

In this multi-element design, a backwash outlet stream 63 comprises a manifold for collecting the backwash streams from the first and second conduits 64 and 65. The backwash exits the filter through outlet 66. In the preferred embodiment of FIG. 3, the hollow shaft 54 is provided with a concentric sleeve 67 which fits over the hollow shaft in spaced relationship. Sleeve 67 serves as a seal member to seal an outlet chamber 68 in the hollow shaft 54.

As with the single stage embodiment described previously, the pressures in the inlet and outlet chambers, and the backwash housings, can be controlled.

Figure 4:
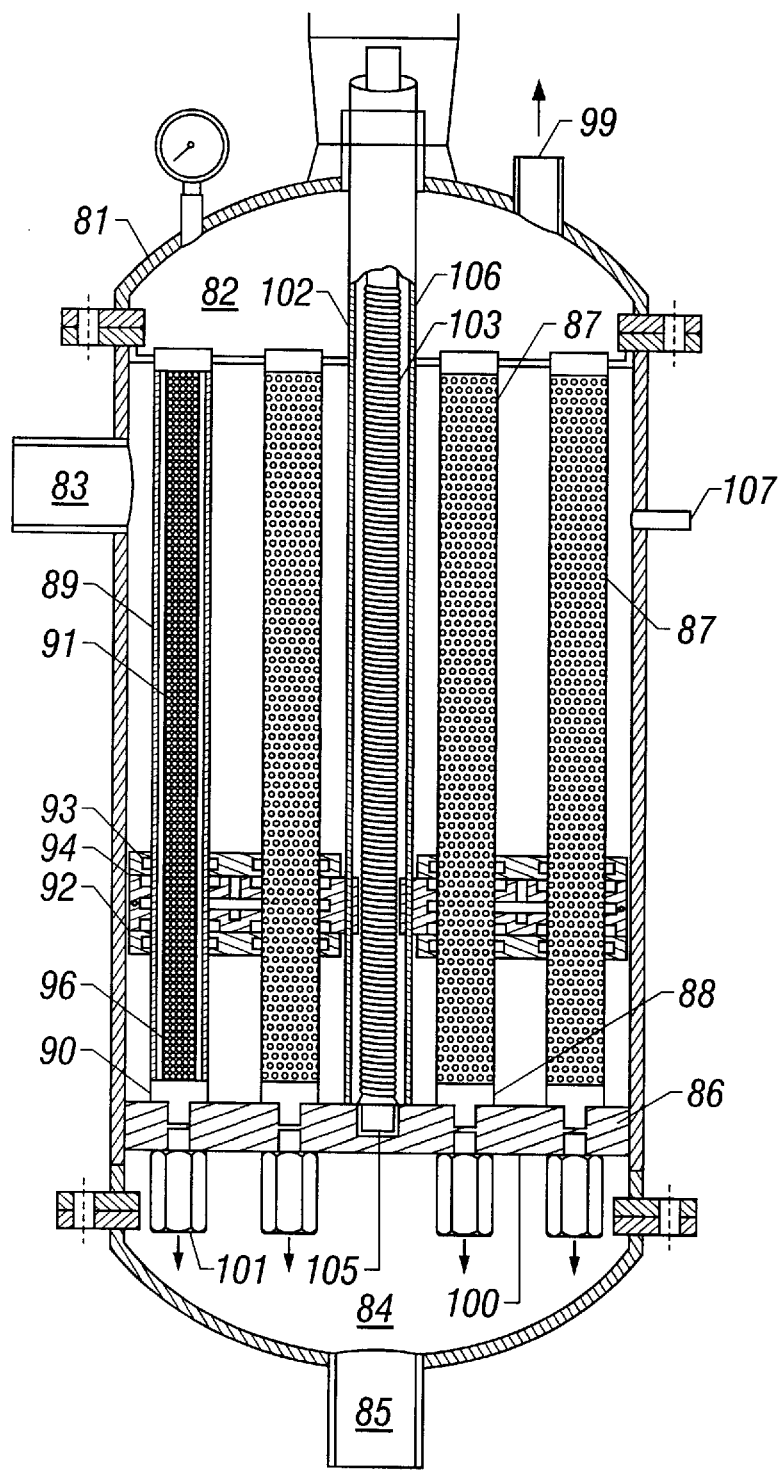
FIG. 4 is a cross-sectional side view of a third embodiment of the filter apparatus using filter tubes.
Figure 5A:
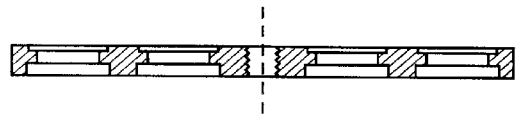
FIGS. 5A and 5B are cross-sectional plan and side views, respectively, of a particle collector used in the third embodiment of the filter apparatus.
Figure 5B:
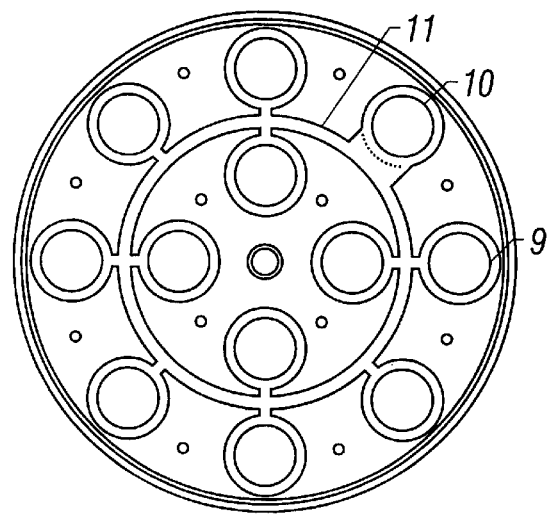
Figure 5C:
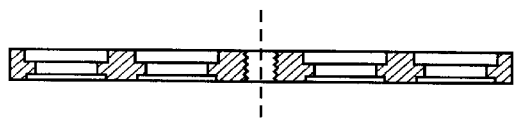
FIGS. 5C and 5D are cross-sectional plan and side views, respectively, of a backwash housing used in the third embodiment of the filter apparatus.
Figure 5D:
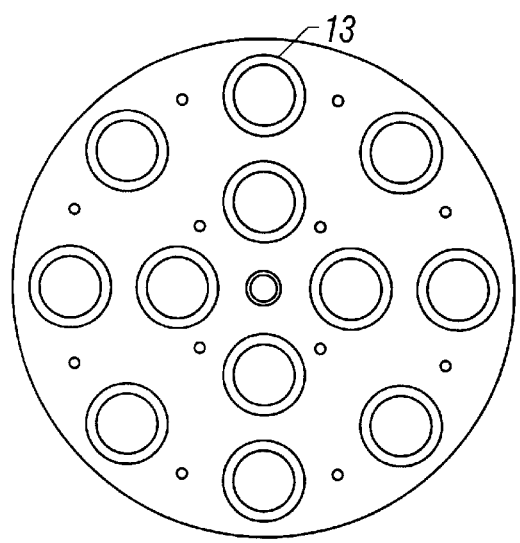

Another embodiment of the invention is illustrated in FIGS. 4 and 5. As shown particularly in FIG. 4, a multistage filter apparatus is generally indicated by the number 80. A filter housing 81 includes an inlet chamber 82 having an inlet 83, and an outlet chamber 84 having an outlet 85. A base plate 86 separates the inlet and outlet chambers. A plurality of filter tubes 87 are located in the inlet chamber 82 and secured at a first end 88 to the base plate 86. While a plurality of tubes 87 are illustrated, it will be understood that a single tube can also be used. The interiors of the filter tubes form outlet conduits 89 which are in fluid communication with the outlet chamber 84 through openings 90 in the base plate 86. Each filter tube has a filter medium 91 on the outer surface thereof facing the inlet chamber 82.

A backwash housing 92 surrounds each of the filter tubes 87 and has seals 93 for slidably sealing a portion of the filter tubes 87 from the inlet chamber 82. Enclosed within the backwash housing 92 is a particle collector 94 which surrounds the perimeter of each of the tubes 87 and includes a tube channel 95 adjacent each of the tube perimeters which exposes a backwash area 96 on the filter medium 91. The backwash areas 96 are isolated from the inlet chamber 82 by virtue of seals 93 in the backwash housing 92.

As shown more clearly in FIG. 5, a main channel 97 connects the tube channel 95 to a discharge tube (not shown). The discharge tube, which can be flexible to facilitate its movement with the backwash housing, discharges backwash fluid into a backwash outlet 98.

The base plate 86 is secured to the filter housing 81 by suitable means, such as welding. The openings 90 in the base plate 86 are preferably threaded to allow the filter tubes to be easily installed and removed and also sealed. In the outlet side 100 of the base plate 86 are adjustable spring-loaded valves 101 or equivalent devices which are attached via, for example, threads to the openings 90. The adjustable valves 101 allow a controlled back pressure in each filter tube 87. When the pressure in a filter tube 87 is higher than the set pressure at its corresponding valve 101, the valve 101 opens and lets filtered fluid flow out into the outlet chamber 84 and exit the filter through outlet 85.

The particle collector 94 is movable along the length of the filter tubes 87 by a suitable drive mechanism, one example of which is a worm drive 102. Worm drive 102 includes a rotatable spindle 103 threadably engaged with corresponding grooves 104 in the backwash housing 92. The worm drive 102 is connected to a motor (not shown) at one end and has a foot bearing 105 in the base plate 86 at the other end. In operation, as the rotatable spindle 103 is rotated by the motor, the backwash housing 92 and particle collector 94 are moved up or down, depending on the direction of rotation. The motor, which can be electrically pneumatically or hydraulically driving is preferably equipped with a speed control and a reverse function to allow the movement of backwash housing 92 to be reversed once it has reached either the top or bottom of the filter tubes. Preferably, the rotatable spindle 103 is protected against contamination by a flexible bellows 106. It is also preferable to provide an injection port 107 for injecting air or other fluid into the inlet chamber 82.

Figure 6:
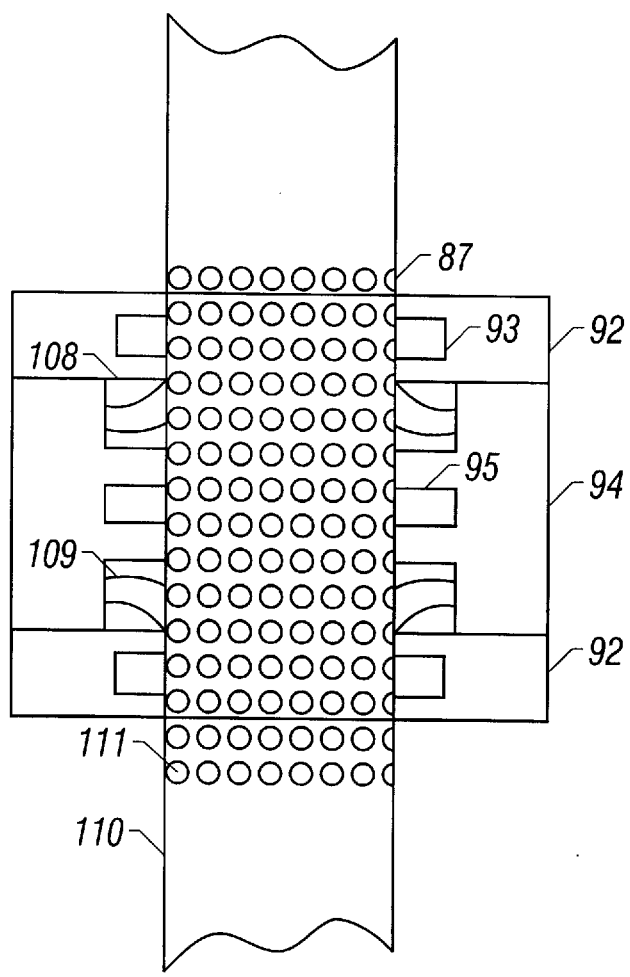
FIG. 6 is a cross section of the sealing arrangement of the third embodiment.
Figure 7:
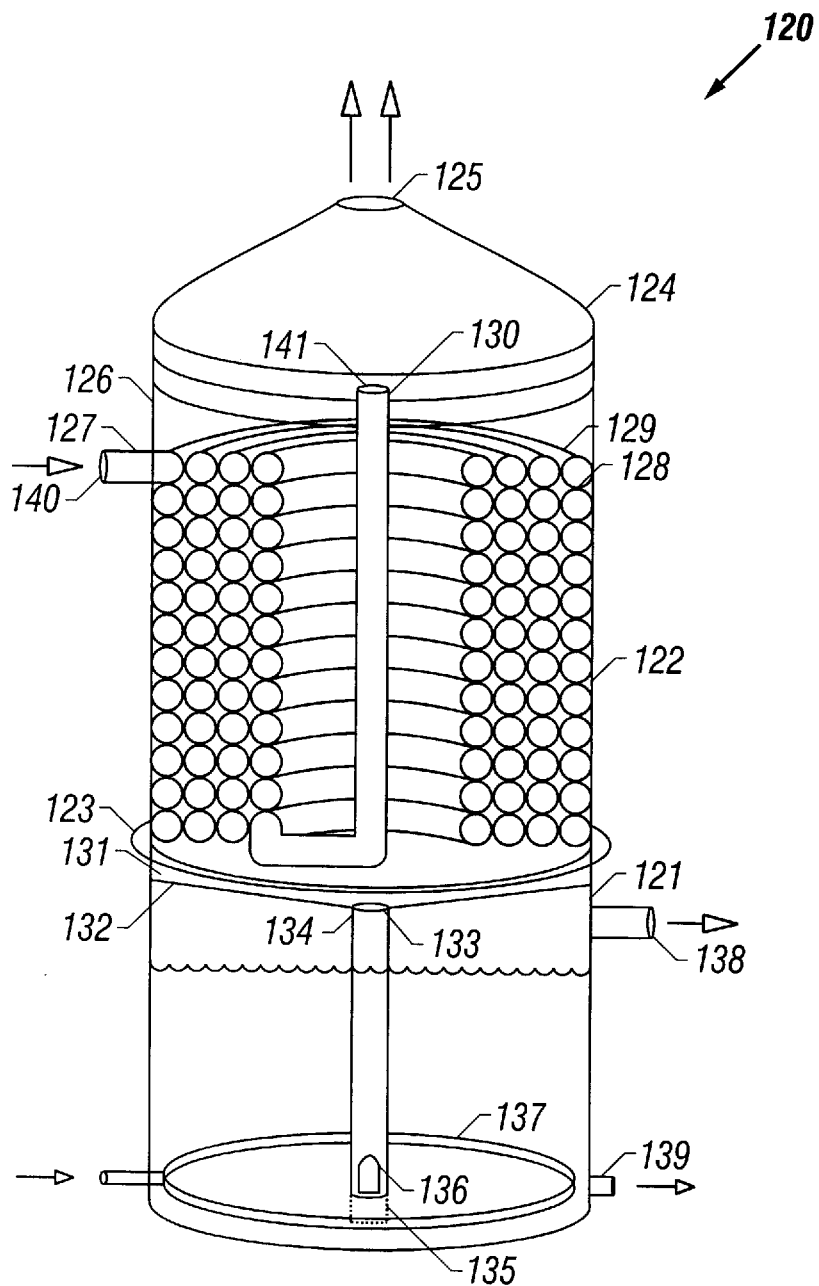
FIG. 7 is a cross-sectional side view of a biological tower of the invention used in conjunction with the filter apparatus.

The sealing arrangement of the filter elements is illustrated in FIG. 6. Located in seal rings 108 are flexible washers 109 which can be constructed of an elastomer or felt. The washers wipe the perforated surface 110 clean as the backwash housing and particle collector pass along the length of the tube. Accumulated solids are pushed into openings 111 and either pass through the filter element or are retained on the outer surface thereof to be removed by the slit 95 as it passes over the holes.

The high capacity filter of the invention can be used in wastewater purification. In a first stage, large particles are removed from the wastewater and separated out. In a second stage, with a smaller pore size filter medium, compressed air is injected together with the wastewater and pressed through the filter element. The air-enriched water is then pumped into a biological tower. The oxygen enriched water allows a "fixed film" system to reproduce microbes immediately to react with the impurities in the water. The wastewater to be processed is liberated of all filterable particles by means of the filter apparatus of the invention (e.g. the embodiments of FIGS. 1–5). In the same process, the particle-free water is enriched with oxygen in the form of ultrafine or atomized air bubbles and pumped into the biological tower. Due to the surplus of free oxygen in the water and free particles, the activity of microbes is quite enormous and colonies form immediately and the system requires only hours in order to be fully activated. By contrast, in traditional biological systems, approximately four to six weeks are required to provide a usable microbiological process.

While the invention is not to be so limited, it is believed that free swimming particles in wastewater delay biological activity owing to the high consumption of free oxygen. The free particles isolate the free oxygen that does not reach the microbes; this state delays and/or eliminates the formation of microbes and microbiological activity. For example, in known biological systems, where multiple rollers are connected in succession, the dirt in the water isolates the surface of the rotating rollers and blocks the absorption of oxygen of the microbes living on the surface. One-third of the diameter of the rotating rollers is in the water and the bulk is out of the water, in order to release the oxygen and the reproducing microbes into the water to be processed. In other processes large amounts of oxygen are pumped into holding tanks. A lot of energy is required to blow the high quantity of oxygen continuously into the tanks. The problem is nevertheless the same; enormous amounts of solids in the water prevent a uniform distribution of oxygen and prevent the necessary colonies of microbes from forming in order to transform the contaminants in the wastewater.

Ultra separation of the finest particles in the wastewater and the accumulation of oxygen for supplying the microbes, combined with the biological tower, represent the ideal environment for microbes in order to clean the wastewater very efficiently and economically.

It has also been discovered that when injecting industrial alcohol, when producing drinking water from rivers and lakes, one could dispense with a doubling of the microbe activity. Normally the aforementioned surface water does not have as high a contamination as wastewater; that is, in the surface water the food supply is not as enormously high as in wastewater, and the injected industrial alcohol decomposes the smaller food supply.

A biological tower suitable for use with the filter apparatus of the invention is illustrated in FIG. 2 and is indicated geney by the number 120.

The biological tower 120 has a bottom tank 121 and a reproduction tank 122. The two fiber glass tanks may be connected together with a flange 123. The reproduction tank 122 is covered with a conical cover 124 whose upper end has an opening 125. The upper side 126 of the reproduction tank 122 has a flange 127, which is connected on the inside of the reproduction tank 122 to a corrugated pipe 128. The corrugated pipe 128 may be rolled in the shape of a spiral on a cylindrical wheel 129. The cylindrical wheel 129 stands vertically in the reproduction tank 122. The other end of the corrugated pipe 128 is connected to an upright stand pipe 130. The upright stand pipe 130 ends above the last winding of the corrugated pipe 128. Inside the cylindrical wheel 129 may be mounted a honeycombed, porous plastic block (not shown), which extends the length of the pipe 128.

In the top side 131 of the bottom tank 121 a catch basin 132 is connected with an outlet opening 133 to a fall pipe 134. The fall pipe 134 has at the bottom outlet 135 four oblong openings 136. In the bottom of the bottom tank 121 there is a nozzle ring 137 with nozzles distributed over the diameter. On the upper side of the bottom tank 121 is an outlet opening 138 which leads to a settling tank. A discharge pipe 139 is attached to the underside of the bottom tank 121.

In operation, the particle-free and oxygen-enriched water coming from the filter is pumped through the inlet opening 140 into the corrugated pipe 127. The microbes immediately form on the surface a fixed film which functions as a reproduction area on the interior wall of the corrugated pipe 127 and the honey comb structure thereby, and start to transform the water. The larger the reproduction area, the more living space for the microbes. The water flowing through the corrugated pipe comes to an outlet opening 141 of the upright stand pipe 130 falls over the outer surface of the corrugated pipe 128 into the catch basin 132 of the bottom tank 121.

Immediately after leaving the stand pipe 130, the free gases of the transformed water are drawn off by an induced draft ventilator (not shown), attached to the opening 125 in the cover 124. The drawn off gases are introduced to a condenser (not shown) and condensed. The exhaust air can escape into the atmosphere without any annoyance caused by bad odor.

The water falling into the catch basin 131 flows through the fall pipe 134 onto the floor of the bottom tank 121. Through the four oval outlet openings of the fall pipe 134 the transformed water with the biomass fills to the top in the bottom tank 121 and flows out through the outlet opening 138 into a settling tank (not shown). After the biomass has sunk and thus separated, the water is filtered to a clear state with a filter apparatus of the invention or other polish filter.

In a specific example, a wastewater treatment in carried out in which the water with a load of 85 mg/liter of TSS can be filtered through a separator with an absolute pore size of 20 microns and in the same working step injected with compressed air at a pressure of 65 psig (4.42 bars). Following the separator, the water would still have 32 mg/l of TSS and is pumped through the biological tower. After filtering in a second step, with a pore size of 3 microns, the water has a load of only 0.6 mg/l of TSS and could be discharged without violating environmental regulations.

The combination of ultra separation and biological treatment is a totally mechanical biological process that does not require any chemicals to process wastewater. This process is very inexpensive and very efficient and operates on a 24 hour basis. The ammonia content in the wastewater may be reduced by 50% in the initially applied ultra separation. After the water in the biological tower 120 leaves the rise pipe 130 in the upper side of the reproduction tank 122, the free ammonia is drawn off through the induced draught ventilator and fed to a cold fall for condensation.

In addition to water filtration and wastewater treatment as described above, the filter apparatus of the invention has may uses in industry. For example, in the petroleum and chemical industries, the filter can be used to remove suspended solids from cooling towers and boiler feeds, feeds to distillation and cracking towers, sulfur from scrubber water, and the like. In pulp and pulp bleaching facilities, the invention can be used inter alia, to remove solids from black and/or green liquor.

Other applications will occur to those skilled in the art.

In a particular application, the filter can be used to desulferize diesel fuel and gasoline.

Another specific application is as a polish filter in wine purification. For this purpose, the filter apparatus includes activated charcoal in the outlet chamber and/or internal volume with a retention screen to retain the charcoal in place. Filtered wire (or other fluid) pass over the charcoal to remove remaining impurities.

Yet another specific application is in oil separation. A common problem in oil reclamation, for example, is that the reclaimed oil is combined with water and forms an emulsion which is difficult to break. By passing the water/oil mixture through the filter of the invention, and simultaneously injecting air or another gas through an injection port into the inlet chamber, the emulsion is broken as the liquid mixture is contacted by the air during passage through the filter element. This occurs because the injected air is broken into very fine bubbles as it passes through the filter element, and these bubbles displace the water attached to the oil. After passing out of the filter, the oil can be easily separated from the water in a phase separator.

While the present invention has been explained in detail with reference to the appended drawings, it is understood that various modifications can be made in the filter apparatus of the present invention without departing from the spirit of the invention or the scope of the claims hereof.

What is claimed is:

1. A method of filtering solids from a fluid and backwashing a filter, comprising the steps of:
   (a) providing an internal volume disposed internally of a filter element;
   (b) passing fluid inwardly through opposing portions of said filter element and directly into said internal volume to filter solids from the fluid;
   (c) discharging filtered fluid from said internal volume through a discharge passage;
   (d) providing a backwash housing arranged to the outside of said filter element and having a slot arrangement arranged to engage opposing portions of said filter element so that said internal volume continuously fluidly communicates with said slot arrangement through said filter element such that at least a portion of fluid, having just passed through the filter and into the internal volume is caused to flow directly through said slot arrangement by passing back outwardly through said filter element;
   (e) maintaining a pressure in said slot arrangement lower than the pressure in said internal volume such that the pressure in said internal volume is greater than the pressure in said slot arrangement plus the pressure drop across the filter element so that a backflow of liquid flows from said internal volume through said filter and into said slot arrangement; and
   (f) producing relative movement between said backwash housing and said filter element to cause said slot arrangement and said filter element to move across one another so that filtered fluid in said internal volume travels outwardly through opposing portions of said filter element and into said slot arrangement to backwash solids collected on said filter element.

2. An apparatus for filtering solids from a fluid and backwashing a filter, comprising:
   (a) a filter medium having opposing sides and providing an internal volume disposed internally of a filter element;
   (b) a pump that pumps fluid inwardly through opposing portions of said filter element and into said internal volume to filter solids from the fluid;
   (c) a discharge passage for discharging filtered fluid from said internal volume;
   (d) a backwash housing arranged to the outside of said filter element and having a slot arrangement arranged to engage opposing portions of said filter element so that said internal volume is in continuous fluid communication with said slot arrangement through said filter element and at least a portion of fluid filtered by said filter is directly communicated outwardly through said filter and into said backwash housing;
   (e) a pressure controller that maintains a pressure in said slot arrangement lower than a pressure in said internal volume such that the pressure in said internal volume is greater than the pressure in said slot arrangement plus the pressure drop across the filter element so that a backflow of liquid flows from said internal volume through said filter directly to said slot arrangement; and
   (f) an actuator that causes relative movement between said backwash housing and said filter element so that filtered fluid in said internal volume, having just passed through said filter and into said internal volume, travels outwardly through opposing portions of said filter element and into said slot arrangement to backwash solids collected on said filter element.

* * * * *